(12) United States Patent
Seo et al.

(10) Patent No.: US 9,127,103 B2
(45) Date of Patent: Sep. 8, 2015

(54) POLYMERIZABLE LIQUID CRYSTAL COMPOUND, A LIQUID CRYSTAL COMPOSITION COMPRISING THE COMPOUND, AND AN OPTICALLY ANISOTROPIC BODY COMPRISING THE SAME

(71) Applicant: LG CHEM, LTD., Seoul (KR)

(72) Inventors: Kyung Chang Seo, Daejeon (KR); Sung-Ho Chun, Daejeon (KR); Dai Seung Choi, Daejeon (KR); Mi-Ra Hong, Hoengseong-gun (KR); Hyeong Bin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/356,013

(22) PCT Filed: Jun. 11, 2013

(86) PCT No.: PCT/KR2013/005136
§ 371 (c)(1),
(2) Date: May 2, 2014

(87) PCT Pub. No.: WO2013/187668
PCT Pub. Date: Dec. 19, 2013

(65) Prior Publication Data
US 2015/0112035 A1    Apr. 23, 2015

(30) Foreign Application Priority Data

Jun. 12, 2012 (KR) .................. 10-2012-0062845
Jun. 11, 2013 (KR) .................. 10-2013-0066364

(51) Int. Cl.
| | |
|---|---|
| C08F 22/10 | (2006.01) |
| C09K 19/20 | (2006.01) |
| C09K 19/32 | (2006.01) |
| C09K 19/04 | (2006.01) |

(52) U.S. Cl.
CPC .............. *C08F 22/10* (2013.01); *C09K 19/20* (2013.01); *C09K 19/322* (2013.01); *C09K 2019/0448* (2013.01)

(58) Field of Classification Search
CPC .. C07C 317/44; C07C 205/57; C07C 205/59; C07C 205/61; C09K 19/3809; C09K 19/32; C09K 19/202; C09K 2019/0448; C09K 19/20; C09K 19/322; C09K 2019/0455; C09K 2019/0466; C08F 22/10
USPC .............. 562/427, 429, 434, 453, 462, 467; 252/299.01, 299.62, 299.67
See application file for complete search history.

(56) References Cited

U.S. PATENT DOCUMENTS

| | | |
|---|---|---|
| 6,136,225 A | 10/2000 | Meyer et al. |
| 2010/0297367 A1 | 11/2010 | Hirai et al. |

FOREIGN PATENT DOCUMENTS

| | | |
|---|---|---|
| CN | 101910106 A | 12/2010 |
| JP | 2009-029929 A | 2/2009 |
| JP | 2011-195795 A | 10/2011 |
| KR | 20090041385 A | 4/2009 |
| KR | 20100014882 A | 2/2010 |
| KR | 20100126182 A | 12/2010 |
| KR | 20110040789 A | 4/2011 |
| KR | 10-1136495 | 4/2012 |
| TW | 201000442 A | 1/2010 |

*Primary Examiner* — Shean C Wu
(74) *Attorney, Agent, or Firm* — Dentons US LLP

(57) ABSTRACT

The present invention relates to a polymerizable liquid crystal compound, a liquid crystal composition including the same, and an optically anisotropic body. The polymerizable liquid crystal compound according to the present invention has not only large solubility in various solvents but also high birefringence and excellent coating orientation, and thus it can provide an optically anisotropic body which is thin but superior in optical properties.

9 Claims, No Drawings

POLYMERIZABLE LIQUID CRYSTAL COMPOUND, A LIQUID CRYSTAL COMPOSITION COMPRISING THE COMPOUND, AND AN OPTICALLY ANISOTROPIC BODY COMPRISING THE SAME

This application is a 35 USC §371 National Stage entry of International Application No. PCT/KR2013/005136, filed Jun. 11, 2013, and claims priority to Korean Application Nos. 10-2012-0062845, filed Jun. 12, 2012, and 10-2013-0066364, filed Jun. 11, 2013, all of which are hereby incorporated by reference in their entirety.

BACKGROUND OF THE INVENTION (a) Field of the Invention

The present invention relates to a polymerizable liquid crystal compound, a liquid crystal composition including the same, and an optically anisotropic body.

(b) Description of the Related Art

A phase retarder is a type of optical element changing the polarization state of light passing through the same, and equally said a wave plate. When a light passes through an electromagnetic phase retarder, the polarization direction (direction of electric field vector) becomes a sum of two elements (an ordinary ray and an extraordinary ray) parallel or perpendicular to the optic axis, and changes after passing the phase retarder because the vector sum of two elements varies according to the birefringence and the thickness of the phase retarder.

Recently, one of big issues of preparing optical film which can be used to the phase retarder is to prepare a high performance film at a small charge. Because, when liquid crystal compounds having high birefringence are used for preparing an optical film, it is possible to realize the necessary retardation value with small quantity of liquid crystal compounds. And, when such liquid crystal compounds are used, it is possible to prepare a thinner folial film.

Therefore, many studies for obtaining the liquid crystal compounds having high birefringence have been carried out actively, but there was a limitation on applying them to the industry in practice because of the orientation problem of the membrane when prior liquid crystal compounds were coated on a film. Particularly, in the case of the liquid crystal compound which is soluble in a specific solvent only, there is a limit to various applications because the kind of films on which the composition including the liquid crystal compound is coated is limited.

SUMMARY OF THE INVENTION

Therefore, it is an aspect of the present invention to provide a polymerizable liquid crystal compound having high birefringence and large solubility in various solvents, and showing excellent orientation when it is coated.

It is another aspect of the present invention to provide a polymerizable liquid crystal composition including the compound.

It is still another aspect of the present invention to provide an optically anisotropic body including the polymer prepared from the polymerizable liquid crystal composition.

According to one embodiment of the present invention, a polymerizable liquid crystal compound represented by Chemical Formula 1 is provided:

[Chemical Formula 1]

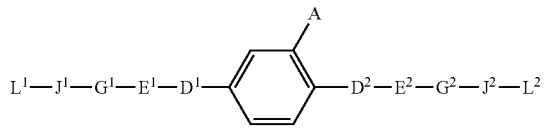

in Chemical Formula 1,

A is aldehyde, nitro, or a $C_1$-$C_5$ alkyl sulfone group;

$D^1$, $D^2$, $G^1$, and $G^2$ are independently a single bond or a divalent connecting group;

$E^1$ and $E^2$ are independently benzene ring or naphthalene ring, and at least one of $E^1$ and $E^2$ is naphthalene ring;

$J^1$ and $J^2$ are independently a $C_1$-$C_{10}$ alkylene group; and $L^1$ and $L^2$ are independently hydrogen or a polymerizable group, where at least one of said $L^1$ and $L^2$ is the polymerizable group.

Furthermore, according to another embodiment of the present invention, a polymerizable liquid crystal composition including the compound represented by Chemical Formula 1 is provided.

And, according to still another embodiment of the present invention, an optically anisotropic body including a hardened material or polymer of the polymerizable liquid crystal compound is provided.

Effects of the Invention

The polymerizable liquid crystal compound according to the present invention has not only large solubility in various solvents but also high birefringence and excellent coating orientation, and thus it can provide an optically anisotropic body which is thin but superior in optical properties.

DETAILED DESCRIPTION OF THE EMBODIMENTS

Hereinafter, the polymerizable liquid crystal compound, the polymerizable liquid crystal composition including the same, and the optically anisotropic body according to the embodiments of the present invention are explained in more detail.

Before that, unless there is overt mention about them in the present specification, technical terms used in the specification are just for representing a specific embodiment and they are not intended to limit the present invention.

And, the singular words used here include plural meaning unless the words represent apparent opposite meaning.

And, the meaning of 'include' used in the present specification specifies specific characteristics, territories, essences, steps, motions, elements, or components, and it does not exclude the addition of other specific characteristics, territories, essences, steps, motions, elements, or components.

Meanwhile, the 'polymerizable liquid crystal compound' is a liquid crystal compound having a polymerizable group, and it is possible to prepare a polymer having a fixed orientation structure of liquid crystal molecules by exposing the compound to an active energy ray after aligning a liquid crystal composition including at least one of the polymerizable liquid crystal compound in a liquid crystal state. The polymer obtained like this shows anisotropy in physical properties such as refractive index, dielectric constant, magnetic susceptibility, modulus, thermal expansion rate, and so on. And, for example, it may be applied to an optically anisotropic body such as a retardation plate, a polarizing plate, a polarizing prism, a brightness enhancing film, a covering material of optical fiber, and so on. And, for example, the properties such as transparency, strength, coatability, solubility, crystallinity, heat resistance, and so on are important besides the anisotropy of the polymer.

As the result of repeating studies for the liquid crystal compound, the present inventors found that the polymerizable liquid crystal compound having the chemical structure like the following Chemical Formula 1 has not only high birefringence but also excellent orientation in coating process and makes it possible to prepare an optically anisotropic body having excellent optical properties with thin thickness, and particularly, the compound shows large solubility in various solvents and can be applied more widely, and accomplished the present invention.

According to one embodiment of the present invention, the polymerizable liquid crystal compound represented by the following Chemical Formula 1 is provided:

[Chemical Formula 1]

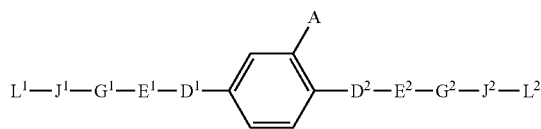

in Chemical Formula 1,

A is aldehyde, nitro, or a $C_1$-$C_5$ alkyl sulfone group;

$D^1$, $D^2$, $G^1$, and $G^2$ are independently a single bond or a divalent connecting group;

$E^1$ and $E^2$ are independently benzene ring or naphthalene ring, and at least one of $E^1$ and $E^2$ is naphthalene ring;

$J^1$ and $J^2$ are independently a $C_1$-$C_{10}$ alkylene group; and $L^1$ and $L^2$ are independently hydrogen or a polymerizable group.

Since the polymerizable liquid crystal compound according to the present invention has the structure of Chemical Formula 1, it can exhibit basically high birefringence and excellent orientation when it is coated. And particularly, it can exhibit large solubility in various solvents due to the substituent A connected to the center benzene ring. Therefore, the polymerizable liquid crystal compound can be dissolved in a solvent like cyclohexanone and coated on a cycloolefin polymer (COP) film and the like. And, it goes without saying that the compound can be coated on triacetyl cellulose (TAC) film and the like by using common solvents known in the art to which the present invention pertains.

According to the present invention, it is advantageous for the realization of said effects that A in Chemical Formula 1 is aldehyde (—CHO), nitro (—$NO_2$), or a $C_1$-$C_5$ alkyl sulfone group (preferably, —$SO_2CH_3$, —$SO_2CH_2CH_3$, and the like).

And, in Chemical Formula 1, $D^1$, $D^2$, $G^1$, and $G^2$ may be independently a single bond or a divalent connecting group. Here, the 'divalent connecting group' may be —O—, —S—, —CO—, —COO—, —OCO—, —O—COO—, —CO—NR—, —NR—CO—, —NR—CO—NR—, —OCH$_2$—, —CH$_2$O—, —SCH—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —C=C—, or —C≡C—, and said R may be independently hydrogen or a $C_1$-$C_{10}$ alkyl group.

Furthermore, each of $E^1$ and $E^2$ in Chemical Formula 1 is independently benzene ring or naphthalene ring, preferably at least one of $E^1$ and $E^2$ may be naphthalene ring, and more preferably each of $E^1$ and $E^2$ may be naphthalene ring.

And, in Chemical Formula 1, said $J^1$ and $J^2$ may be independently a $C_1$-$C_{10}$ alkylene group, preferably a $C_2$-$C_9$ alkylene group, and more preferably a $C_3$-$C_6$ alkylene group.

And, in Chemical Formula 1, said $L^1$ and $L^2$ may be independently hydrogen or a polymerizable group. Here, the 'polymerizable group' can be defined as any cross-linkable or polymerizable functional group such as a unsaturated bond and (meth)acrylate group. According to the present invention, said $L^1$ and $L^2$ may be independently hydrogen, an acrylate, a methacrylate, an epoxy, and so on.

Specific examples of the polymerizable liquid crystal compound of Chemical Formula 1 may be represented by the following Chemical Formulae 2a to 2d. In Chemical Formulae 2a to 2d, n may be an integer of 1 to 10. However, the polymerizable liquid crystal compound of the present invention is not limited by or to the following exemplified compounds.

[Chemical Formula 2a]

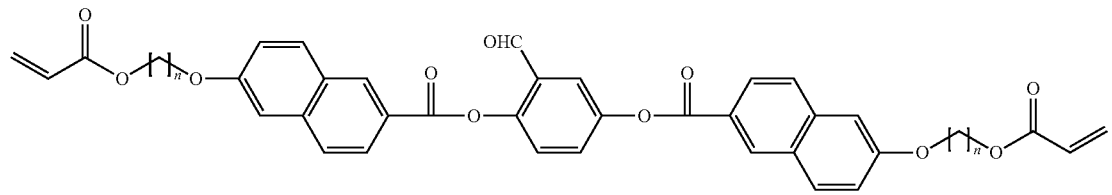

[Chemical Formula 2b]

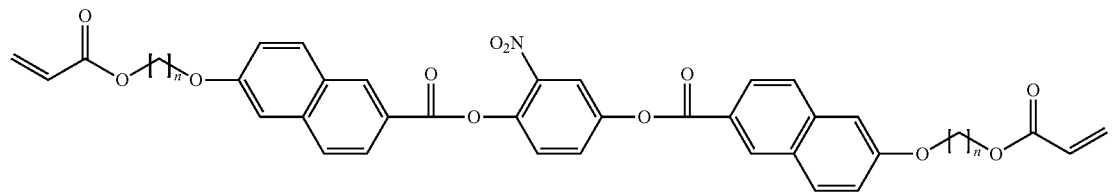

[Chemical Formula 2c]

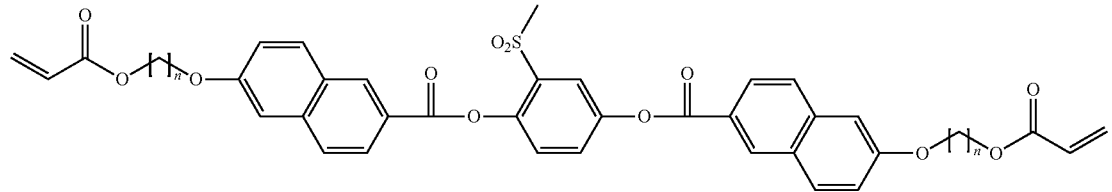

[Chemical Formula 2d]

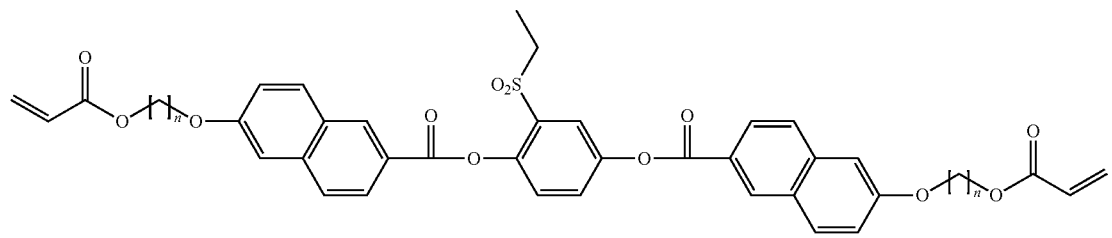

Meanwhile, the polymerizable liquid crystal compound represented by Chemical Formula 1 may be prepared by applying a known reaction, and more detailed preparation method will be disclosed in Examples of the present specification.

According to another embodiment of the present invention, the polymerizable liquid crystal composition including the compound represented by Chemical Formula 1 is provided.

The composition according to the present invention includes the compound represented by Chemical Formula 1 which is a polymerizable liquid crystal monomer, and can be homopolymerized or copolymerized by using the compound of Chemical Formula 1 alone or in combination.

The composition may further include an arbitrary liquid crystal compound in addition to the compound of Chemical Formula 1, and the arbitrary liquid crystal compound may have a polymerizable property or not. Here, for example, the arbitrary liquid crystal compound may be a liquid crystal compound having an ethylenically unsaturated bond, a compound having an optical active group, a rod-like liquid crystal compound, and the like.

At this time, the arbitrary liquid crystal compounds may be mixed with a proper amount according to their structure. Preferably, it is advantageous in the aspect of achieving the object of the present invention that the content of the compound of Chemical Formula 1 is 60 wt % or more per the total monomer weight.

The polymerizable liquid crystal composition may further include an additive such as a solvent, a polymerization initiator, a stabilizer, a liquid crystal orientation agent, a dye, a pigment, and so on. The additive may be a common component in the technical field to which the present invention pertains, and the details are not limited.

On the other hand, according to still another embodiment of the present invention, an optically anisotropic body including a hardened material or polymer of the polymerizable liquid crystal compound of Chemical Formula 1 is provided.

The optically anisotropic body may include a hardened material or polymer in which at least part of the end polymerizable groups of the polymerizable liquid crystal compound of Chemical Formula 1 is addition-polymerized or cross-linked.

Specifically, as the optically anisotropic body according to the present invention includes the hardened material or polymer of the polymerizable liquid crystal compound, the light leakage phenomenon can be disappeared or minimized with high retardation value. Furthermore, the optically anisotropic body according to the present invention is thinner than prior laminate type optically anisotropic body and can be prepared by more simplified process.

Meanwhile, the optically anisotropic body may be prepared by coating and drying the polymerizable liquid crystal composition on a substrate, aligning the liquid crystal compound, and polymerizing the same by UV irradiation.

Here, the substrate is not limited particularly but a glass plate, a poly(ethyleneterephthalate) film, a cellulose-based film, and so on may be used. In the process of coating the polymerizable liquid crystal composition on the substrate, any known methods can be used without particular limitation, and for example, a roll coating method, a spin coating method, a bar coating method, a spray coating method, and so on can be used.

And, in the process of aligning the polymerizable liquid crystal composition, any known methods can be used, for example, a method of rubbing the composition layer formed or a method of applying a magnetic field or an electric field to the composition layer formed may be used.

The thickness of the optically anisotropic body may be adjusted according to its use, and preferably it may be in the range of 0.01 to 100 μm.

Such optically anisotropic body of the present invention may be used as an optical element such as a retardation film of liquid crystal display device, an optical compensation plate, an alignment layer, a polarizing plate, a viewing angle magnification plate, a reflective film, a color filter, a holographic element, a light polarizing prism, an optical head, and the like.

Hereinafter, the function and effects of the present invention is explained in more detail by referring to specific examples of the present invention. However, the following examples are only for the understanding of the present invention and the scope of the present invention is not limited to or by them.

[Scheme 1: Examples 1~6]

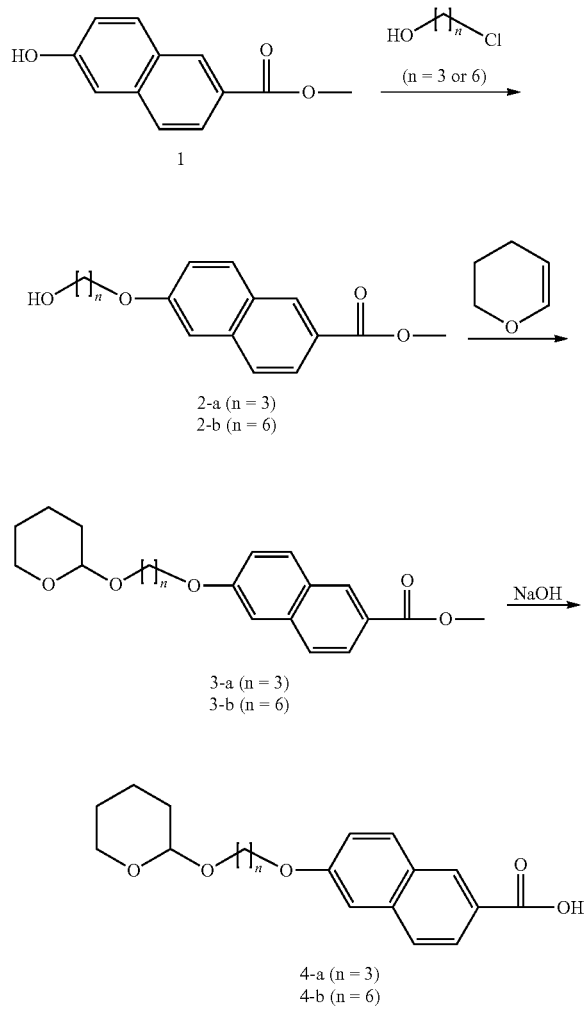

EXAMPLE 1

Synthesis of Compound 2-a

In Scheme 1, after dissolving about 100 g of methyl 6-hydroxy-2-naphthoate (compound 1), about 94 g of 3-chloropropanol, and about 182 g of potassium carbonate in acetone, the solution was stirred and refluxed for about 24 hrs. After cooling the reacted mixture to room temperature, the product was filtered so as to eliminate the solid, and distilled under reduced pressure. And then, about 132 g of compound 2-a (n=3) was obtained by column chromatography purification.

EXAMPLE 2

Synthesis of Compound 2-b

About 110 g of compound 2-b (n=6) was obtained substantially according to the same method and condition as in Example 1, except that 6-chlorohexanol was used instead of 3-chloropropanol.

EXAMPLE 3

Synthesis of Compound 3-a

After dissolving about 120 g of compound 2-a according to Example 1 and about 21 g of PPTS (pyridinium p-toluene sulfonate) in dichloromethane, the solution was cooled to about 0° C. After adding about 42 g of 3,4-dihydro-2H-pyran dissolved in dichloromethane thereto in drops, the mixture was stirred for about 12 hrs. After washing the reacted solution with brine and chemically drying the same, about 145 g of compound 3-a (n=3) was obtained by distilling the same under reduced pressure.

EXAMPLE 4

Synthesis of Compound 3-b

About 127 g of compound 3-b (n=6) was obtained substantially according to the same method and condition as in Example 3, except that compound 2-b according to Example 2 was used instead of compound 2-a.

EXAMPLE 5

Synthesis of Compound 4-a

After dissolving about 140 g of compound 3-a according to Example 3, sodium hydroxide (2M, 300 ml) was added thereto. The solution was stirred and refluxed for about 2 hrs, and distilled under reduced pressure. After dissolving the reaction product in water and dichloromethane, 3M hydrochloric acid was used so as to make the solution pH 5. The organic layer was separated from the solution, chemically dried, and distilled under reduced pressure, and about 107 g of white solid compound 4-a (n=3) was obtained by washing the same with hexane.

EXAMPLE 6

Synthesis of Compound 4-b

About 89 g of compound 4-b (n=6) was obtained substantially according to the same method and condition as in Example 5, except that compound 3-b according to Example 4 was used instead of compound 3-a.

[Scheme 2: Examples 7~22]

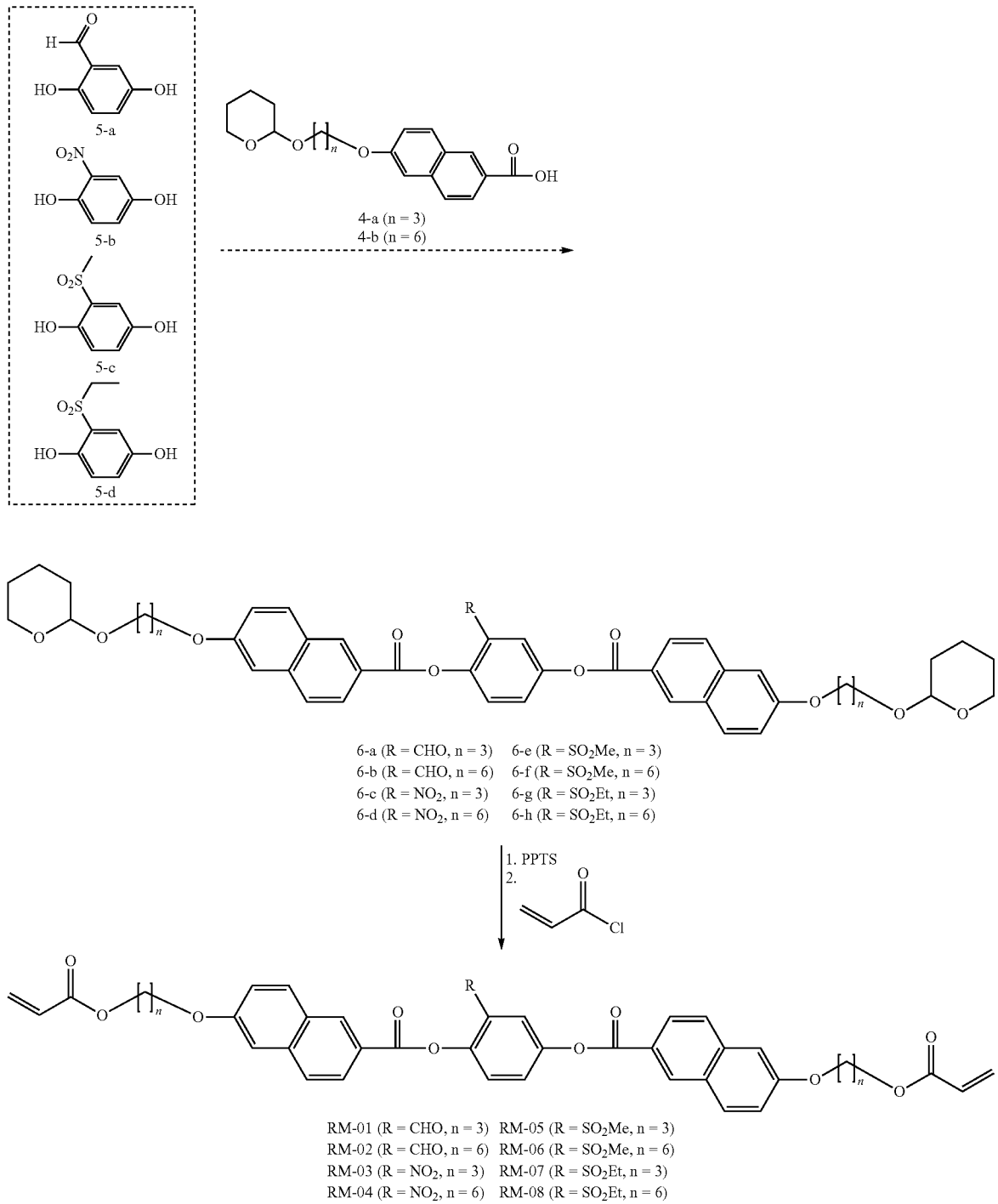

EXAMPLE 7

Synthesis of Compound 6-a

After dissolving about 12.1 g of compound 4-a according to Example 5, about 3 g of 2,5-dihydroxybenzaldehyde (compound 5-a), and about 7.2 g of EDC (N-(3-dimethylaminopropyl)-N'-ethylcarbodiimide hydrochloride) in dichloromethane, the solution was cooled to about 0° C. After adding about 0.9 g of dimethyl aminopyridine and about 9 g of diisopropyl ethylamine thereto, the mixture was stirred for about 3 hrs. The reacted solution was diluted with dichloromethane, washed with 1N hydrochloric acid and brine, and chemically dried. The reacted product was obtained by filtration and distillation under reduced pressure. The collected product was purified by column chromatography and about 11 g of compound 6-a (R=CHO, n=3) was obtained.

EXAMPLE 8

Synthesis of Compound 6-b

About 11.5 g of compound 6-b (R=CHO, n=6) was obtained substantially according to the same method and condition as in Example 7, except that compound 4-b according to Example 6 was used instead of compound 4-a.

EXAMPLE 9

Synthesis of Compound 6-c

About 12.1 g of compound 6-c (R=$NO_2$, n=3) was obtained substantially according to the same method and condition as in Example 7, except that 2-nitrobenzene-1,4-diol (compound 5-b) [Journal of Applied Polymer Science, 2011, 121, 1, 582] was used instead of compound 5-a.

EXAMPLE 10

Synthesis of Compound 6-d

About 11.5 g of compound 6-d (R=$NO_2$, n=6) was obtained substantially according to the same method and condition as in Example 9, except that compound 4-b was used instead of compound 4-a.

EXAMPLE 11

Synthesis of Compound 6-e

About 13 g of compound 6-e (R=$SO_2Me$, n=3) was obtained substantially according to the same method and condition as in Example 7, except that 2-(methylsulfonyl)benzene-1,4-diol (compound 5-c) [Synthesis, 2001, 9, 1363] was used instead of compound 5-a.

EXAMPLE 12

Synthesis of Compound 6-f

About 10.2 g of compound 6-f (R=$SO_2Me$, n=6) was obtained substantially according to the same method and condition as in Example 11, except that compound 4-b was used instead of compound 4-a.

EXAMPLE 13

Synthesis of Compound 6-g

About 12 g of compound 6-g (R=$SO_2Et$, n=3) was obtained substantially according to the same method and condition as in Example 7, except that 2-(ethylsulfonyl)benzene-1,4-diol (compound 5-d) [Synthesis, 2001, 9, 1363] was used instead of compound 5-a.

EXAMPLE 14

Synthesis of Compound 6-h

About 12 g of compound 6-h (R=$SO_2Et$, n=6) was obtained substantially according to the same method and condition as in Example 13, except that compound 4-b was used instead of compound 4-a.

EXAMPLE 15

Synthesis of Compound RM-01

After dissolving about 10 g of compound 6-a according to Example 7 and about 0.4 g of PPTS (pyridinium p-toluene sulfonate) in tetrahydrofuran, and the mixture was stirred and refluxed for about 2 hrs. And then, the reacted solution was distilled under reduced pressure so as to remove the solvent, and the remains were diluted with dichloromethane and washed with brine. The organic layer obtained like this was chemically dried and distilled under reduced pressure, and white solid compound was obtained.

After dissolving said white solid compound in about 90 ml of dimethyl acetamide, the solution was cooled to about 0° C. After adding about 7 g of acryloyl chloride thereto in drops for 30 mins, the mixture was stirred at room temperature for about 2 hrs. The reacted solution was diluted with diethyl ether and washed with a sodium chloride aqueous solution. After collecting the organic part from the product and chemically drying the same, the solvent was eliminated by distillation under reduced pressure. The collected product was purified by column chromatography and about 9.1 g of compound RM-01 (R=CHO, n=3) was obtained. NMR spectrum of compound RM-01 is as follows.

$^1$H NMR (CDCl$_3$, standard material TMS) δ(ppm): 10.34 (1H,s), 8.54(2H,s), 8.19(2H,d), 7.76(3H,m), 7.60(2H,d), 7.51 (1H,d), 7.45(1H,d), 7.06(4H,m), 6.44(2H,dd), 6.01(2H,dd), 5.81(2H,dd), 4.16(4H,m), 4.08(4H,m), 1.99(4H,m)

And, the organization of compound RM-01 was observed with a polarizing microscope and the phase transition temperature was measured. As a result, when the temperature increased, the crystalline phase was changed into nematic phase at about 198° C. and isotropic liquid crystal phase appeared when the temperature exceeded about 212° C. In this way, it was recognized that compound RM-01 forms nematic phase in the temperature range of about 198° C. to 212° C.

EXAMPLE 16

Synthesis of Compound RM-02

About 9.9 g of compound RM-02 (R=CHO, n=6) was obtained substantially according to the same method and condition as in Example 15, except that compound 6-b according to Example 8 was used instead of compound 6-a.

NMR spectrum of compound RM-02 is as follows.

$^1$H NMR (CDCl$_3$, standard material TMS) δ(ppm): 10.40 (1H,s), 8.44(2H,s), 8.21(2H,d), 7.72(3H,m), 7.58(2H,d), 7.50 (1H,d), 7.44(1H,d), 7.10(4H,m), 6.44(2H,dd), 6.11(2H,dd), 5.82(2H,dd), 4.12(4H,m), 4.08(4H,m), 1.72(4H,m), 1.54(4H,m), 1.31(8H,m)

And, it was found that compound RM-02 forms nematic phase in the temperature range of about 176° C. to 192° C. by the same method as in Example 15.

EXAMPLE 17

Synthesis of Compound RM-03

About 9.1 g of compound RM-03 (R=$NO_2$, n=3) was obtained substantially according to the same method and condition as in Example 15, except that compound 6-c according to Example 9 was used instead of compound 6-a.

NMR spectrum of compound RM-03 is as follows.

$^1$H NMR (CDCl$_3$, standard material TMS) δ(ppm): 8.52 (2H,s), 8.20(3H,m), 7.75(2H,m), 7.60(3H,m), 7.48(1H,d), 7.00(4H,m), 6.45(2H,dd), 6.06(2H,dd), 5.87(2H,dd), 4.19(4H,m), 4.01(4H,m), 1.97(4H,m)

And, it was found that compound RM-03 forms nematic phase in the temperature range of about 192° C. to 220° C. by the same method as in Example 15.

EXAMPLE 18

Synthesis of Compound RM-04

About 8.2 g of compound RM-04 (R=NO$_2$, n=6) was obtained substantially according to the same method and condition as in Example 15, except that compound 6-d according to Example 10 was used instead of compound 6-a.

NMR spectrum of compound RM-04 is as follows.

$^1$H NMR (CDCl$_3$, standard material TMS) δ(ppm): 8.49 (2H,s), 8.19(3H,m), 7.73(2H,m), 7.52(3H,m), 7.40(1H,d), 6.93(4H,m), 6.44(2H,dd), 6.11(2H,dd), 5.81(2H,dd), 4.13(4H,m), 4.06(4H,m), 1.78(4H,m), 1.49(4H,m), 1.33(8H, m)

And, it was found that compound RM-04 forms nematic phase in the temperature range of about 201° C. to 216° C. by the same method as in Example 15.

EXAMPLE 19

Synthesis of Compound RM-05

About 9.4 g of compound RM-05 (R=SO$_2$Me, n=3) was obtained substantially according to the same method and condition as in Example 15, except that compound 6-e according to Example 11 was used instead of compound 6-a.

NMR spectrum of compound RM-05 is as follows.

$^1$H NMR (CDCl$_3$, standard material TMS) δ(ppm): 8.52 (2H,s), 8.20(2H,d), 7.89(1H,s), 7.75(2H,d), 7.60(2H,d), 7.50 (1H,d), 7.21(1H,d), 7.02(4H,m), 6.39(2H,dd), 6.02(2H,dd), 5.91(2H,dd), 4.20(4H,m), 3.99(4H,m), 2.88(3H,s), 1.96(4H, m)

And, it was found that compound RM-05 forms nematic phase in the temperature range of about 188° C. to 210° C. by the same method as in Example 15.

EXAMPLE 20

Synthesis of Compound RM-06

About 9.3 g of compound RM-06 (R=SO$_2$Me, n=6) was obtained substantially according to the same method and condition as in Example 15, except that compound 6-f according to Example 12 was used instead of compound 6-a.

NMR spectrum of compound RM-06 is as follows.

$^1$H NMR (CDCl$_3$, standard material TMS) δ(ppm): 8.50 (2H,s), 8.19(2H,d), 7.87(1H,s), 7.70(2H,d), 7.61(2H,d), 7.48 (1H,d), 7.23(1H,d), 7.03(4H,m), 6.44(2H,dd), 6.10(2H,dd), 5.92(2H,dd), 4.15(4H,m), 4.01(4H,m), 2.89(3H,s), 1.80(4H, m), 1.51(4H,m), 1.32(8H,m)

And, it was found that compound RM-06 forms nematic phase in the temperature range of about 193° C. to 221° C. by the same method as in Example 15.

EXAMPLE 21

Synthesis of Compound RM-07

About 11.5 g of compound RM-07 (R=SO$_2$Et, n=3) was obtained substantially according to the same method and condition as in Example 15, except that compound 6-g according to Example 13 was used instead of compound 6-a.

NMR spectrum of compound RM-07 is as follows.

$^1$H NMR (CDCl$_3$, standard material TMS) δ(ppm): 8.49 (2H,s), 8.22(2H,d), 7.88(1H,s), 7.72(2H,d), 7.56(2H,d), 7.46 (1H,d), 7.20(1H,d), 6.99(4H,m), 6.40(2H,dd), 6.01(2H,dd), 5.89(2H,dd), 4.19(4H,m), 3.99(4H,m), 3.41(2H,m), 2.84(3H,s), 1.99(4H,m), 1.28(3H,t)

And, it was found that compound RM-07 forms nematic phase in the temperature range of about 174° C. to 189° C. by the same method as in Example 15.

EXAMPLE 22

Synthesis of Compound RM-08

About 9.4 g of compound RM-08 (R=SO$_2$Et, n=6) was obtained substantially according to the same method and condition as in Example 15, except that compound 6-h according to Example 14 was used instead of compound 6-a.

NMR spectrum of compound RM-08 is as follows.

$^1$H NMR (CDCl$_3$, standard material TMS) δ(ppm): 8.48 (2H,s), 8.20(2H,d), 7.89(1H,s), 7.69(2H,d), 7.52(2H,d), 7.44 (1H,d), 7.19(1H,d), 7.01(4H,m), 6.39(2H,dd), 6.01(2H,dd), 5.84(2H,dd), 4.12(4H,m), 4.04(4H,m), 2.87(3H,s), 1.82(4H, m), 1.52(4H,m), 1.31(8H,m), 1.27(3H,t)

And, it was found that compound RM-08 forms nematic phase in the temperature range of about 185° C. to 201° C. by the same method as in Example 15.

[Scheme 3: Comparative Examples 1~4]

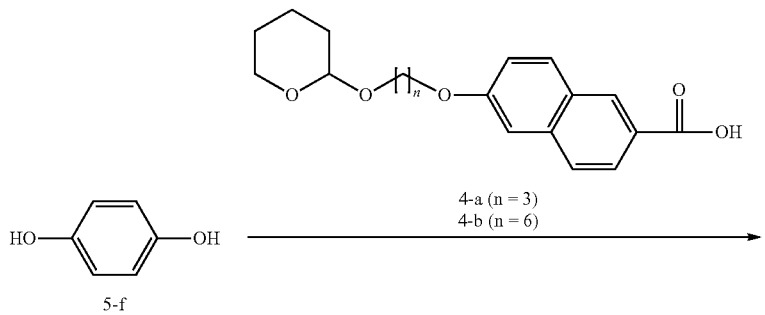

-continued

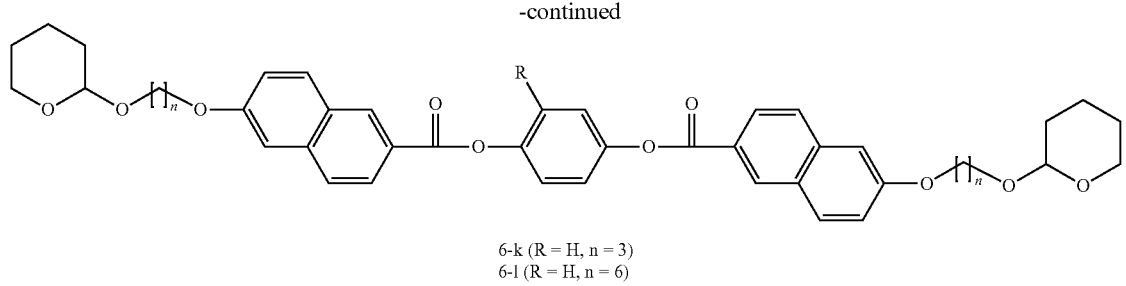

6-k (R = H, n = 3)
6-l (R = H, n = 6)

1. PPTS
2.

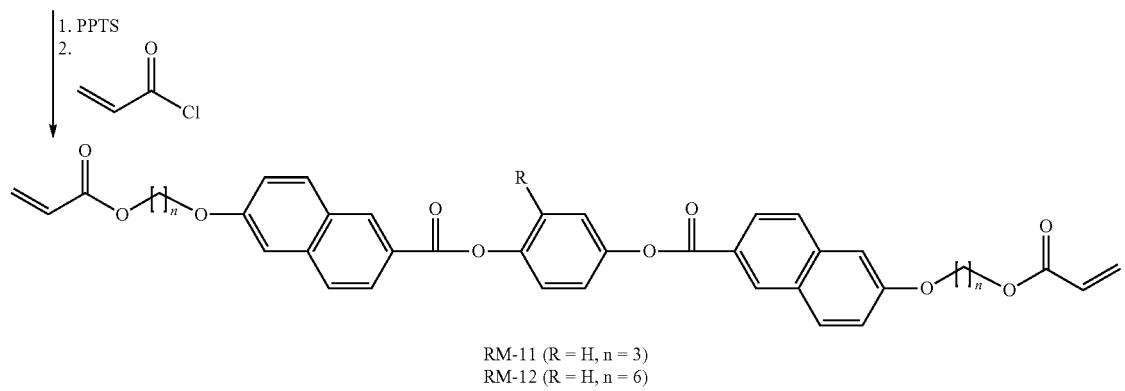

RM-11 (R = H, n = 3)
RM-12 (R = H, n = 6)

COMPARATIVE EXAMPLE 1

Synthesis of Compound 6-k

About 11.9 g of compound 6-k (R=H, n=3) was obtained substantially according to the same method and condition as in Example 7, except that hydroquinone (compound 5-f) was used instead of compound 5-a.

COMPARATIVE EXAMPLE 2

Synthesis of Compound 6-l

About 10.3 g of compound 6-l (R=H, n=6) was obtained substantially according to the same method and condition as in Comparative Example 1, except that compound 4-b was used instead of compound 4-a.

COMPARATIVE EXAMPLE 3

Synthesis of Compound RM-09

About 12 g of compound RM-09 (R=H, n=3) was obtained substantially according to the same method and condition as in Example 15, except that compound 6-k according to Comparative Example 1 was used instead of compound 6-a.

NMR spectrum of compound RM-09 is as follows.

$^1$H NMR (CDCl$_3$, standard material TMS) δ(ppm): 8.52 (2H,s), 8.20(2H,d), 7.75(2H,d), 7.60(2H,d), 7.22(4H,d), 7.02 (4H,m), 6.44(2H,dd), 6.09(2H,dd), 5.90(2H,dd), 4.04(4H,m), 3.95(4H,m), 1.99(4H,m)

And, it was found that compound RM-09 forms nematic phase in the temperature range of about 190° C. to 205° C. by the same method as in Example 15.

COMPARATIVE EXAMPLE 4

Synthesis of Compound RM-10

About 11.1 g of compound RM-10 (R=H, n=6) was obtained substantially according to the same method and condition as in Example 15, except that compound 6-l according to Comparative Example 2 was used instead of compound 6-a.

NMR spectrum of compound RM-10 is as follows.

$^1$H NMR (CDCl$_3$, standard material TMS) δ(ppm): 8.50 (2H,s), 8.19(2H,d), 7.73(2H,d), 7.62(2H,d), 7.24(4H,d), 7.00 (4H,m), 6.45(2H,dd), 6.07(2H,dd), 5.91(2H,dd), 4.14(4H,m), 4.04(4H,m), 1.75(4H,m), 1.51(4H,m), 1.29(8H, m)

And, it was found that compound RM-10 forms nematic phase in the temperature range of about 201° C. to 212° C. by the same method as in Example 15.

PREPARATION EXAMPLES 1~8

Preparation of Retardation Film

A polymerizable liquid crystal composition including 25 parts by weight of compound RM-01, 5 parts by weight of photoinitiator (Irgacure 907, made by Ciba-Geigy Co., Swiss), and the rest amount of CPO (cyclopentanone) per 100 parts by weight of total composition was prepared.

The liquid crystal composition coated with a roll coating method on a TAC (triacetyl cellulose) film on which norbornene-based photoaligning material was coated, and dried at about 80° C. for 2 mins so as that the liquid crystal compound was aligned. And then, the retardation film was prepared by exposing the film to a non-polarized UV from a high pressure mercury lamp of 200 mW/cm$^2$ so as to fixing the oriented state of the liquid crystal.

Like above method, the compositions including any one of compounds RM-02 to RM-08 instead of compound RM-01 were prepared, and the retardation films were prepared respectively by using the same.

COMPARATIVE PREPARATION EXAMPLES 1~2

Preparation of Retardation Film

The retardation films were prepared substantially according to the same method as in Preparation Examples 1~8, except that compounds RM-09 and RM-10 were used respectively instead of compound RM-01.

REFERENCE EXAMPLE

The polymerizable liquid crystal compound (RM 257, made by XI'AN RUILIAN MODERN Co., Ltd) represented by the following Chemical Formula 10 was prepared as the reference example:

TABLE 1

| Com- | Tol- | Toluene + | | | Δn |
| pound | uene | Heated | TXB | Cyclopentanone | (Solvent, Film) |
| --- | --- | --- | --- | --- | --- |
| RM-01 | Δ | ○ | ○ | ○ | 0.17 (TXB, TAC) |
| RM-02 | Δ | ○ | ○ | Δ | 0.18 (TXB, TAC) |
| RM-03 | ○ | ○ | ○ | ○ | 0.17 (TXB, TAC) |
| RM-04 | Δ | ○ | ○ | ○ | 0.20 (TXB, TAC) |
| RM-05 | ○ | ○ | ○ | ○ | 0.19 (TXB, TAC) |
| RM-06 | Δ | ○ | ○ | ○ | 0.20 (TXB, TAC) |
| RM-07 | ○ | ○ | ○ | ○ | 0.19 (TXB, TAC) |
| RM-08 | Δ | ○ | ○ | ○ | 0.22 (TXB, TAC) |
| RM-09 | x | Δ | x | Δ | — |
| RM-10 | x | Δ | x | Δ | — |
| RM257 | Δ | ○ | ○ | ○ | 0.12 (TXB, TAC) |

[Chemical Formula 10]

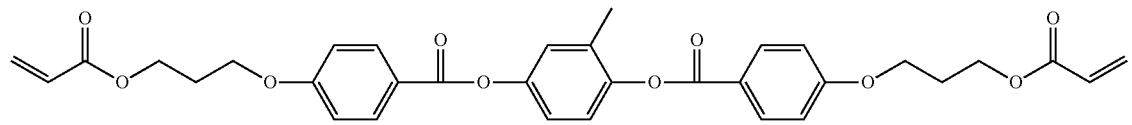

And, the retardation film was prepared substantially according to the same method as in Preparation Examples 1~8, except that the compound of Chemical Formula 10 was used instead of compound RM-01.

EXPERIMENTAL EXAMPLE 1

Measurement of Solubility of the Compound

Concerning compounds RM-01 to RM-08 according to Examples 15~22, compounds RM-09 and RM-10 according to Comparative Examples 3 and 4, and compound RM 257 according to Reference Example, the solubility in various solvents were measured. At this time, the content of each compound in the solvent was 25 parts by weight per 100 parts by weight of total solution. The solubility of the compound was measured and the results are listed in Table 1.

In the following Table 1, when the compound was completely dissolved in the solvent and the solution was transparent, it was indicated by '○'; when the compound was dissolved in the solvent but the solution was opaque, it was indicated by 'Δ'; and when the compound was not dissolved at all, it was indicated by 'x'. And, the term 'heated' in Table 1 means that the solution of room temperature including the compound was heated for about 10 secs by using a heat gun. And, the term 'TXB' in Table 1 means the mixed solvent of Toluene:Xylene:Butyl cellosolve=7:2:1 (weight ratio).

EXPERIMENTAL EXAMPLE 2

Measurement of Birefringence

Quantitative retardation values of the retardation films according to Preparation Examples 1~8, Comparative Preparation Examples 1~2, and Reference Example were measured by using Axoscan (made by Axomatrix Co.). At this time, the thickness of the film was independently measured and Δn was calculated from the obtained values. The results are listed in Table 1.

As shown in Table 1, compounds RM-09 and RM-10 according to Comparative Examples were not dissolved in toluene at all. And, even in the case of putting the compounds in toluene and heating the same, just opaque solution was obtained. Furthermore, the compounds were not dissolved in TXB mixed solvent at all.

By comparison, compounds RM-01 to RM-08 according to Examples were easily dissolved in toluene at all. And, it was recognized that the compounds were completely dissolved and the solution becomes transparent when the solution was heated. Furthermore, most of the compounds RM-01 to RM-08 according to Examples showed high solubility in cyclopentanone, and they showed high solubility in the TXB mixed solvent particularly.

In addition, it was recognized that the retardation films including compounds RM-01 to RM-08 according to Preparation Examples 1~8 have higher birefringence than the film of Reference Example.

What is claimed is:

1. A polymerizable liquid crystal compound represented by the following Chemical Formula 1 is provided:

[Chemical Formula 1]

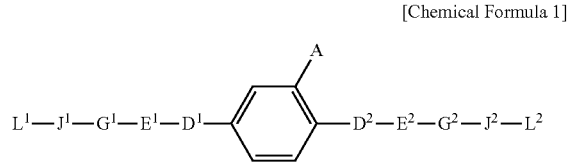

in Chemical Formula 1,

A is aldehyde, nitro, or a $C_1$-$C_5$ alkyl sulfone group;

$D^1$, $D^2$, $G^1$, and $G^2$ are independently a single bond or a divalent connecting group;

$E^1$ and $E^2$ are independently benzene ring or naphthalene ring, and at least one of $E^1$ and $E^2$ is naphthalene ring;

$J^1$ and $J^2$ are independently a $C_1$-$C_{10}$ alkylene group; and $L^1$ and $L^2$ are independently hydrogen or a polymerizable group, wherein at least one of said $L^1$ and $L^2$ is the polymerizable group.

2. The polymerizable liquid crystal compound according to claim 1, wherein each of $E^1$ and $E^2$ is naphthalene ring.

3. The polymerizable liquid crystal compound according to claim 1, wherein $D^1$, $D^2$, $G^1$, and $G^2$ are independently a single bond, —O—, —S—, —CO—, —COO—, —OCO—, —O—COO—, —CO—NR—, —NR—CO—, —NR—CO—NR—, —OCH$_2$—, —CH$_2$O—, —SCH—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —C=C—, or —C≡C—; and said R is independently hydrogen or a $C_1$-$C_{10}$ alkyl group.

4. The polymerizable liquid crystal compound according to claim 1, wherein each of $L^1$ and $L^2$ is independently hydrogen, an acrylate, a methacrylate, or an epoxy; and at least one of said $L^1$ and $L^2$ is the acrylate, the methacrylate, or the epoxy.

5. A polymerizable liquid crystal composition, including the compound according to claim 1.

6. The polymerizable liquid crystal composition according to claim 5, further including a polymerization initiator and a solvent.

7. An optically anisotropic body, including the polymerizable liquid crystal compound of Chemical Formula 1 according to claim 1.

8. The optically anisotropic body according to claim 7, including a hardened material or polymer in which at least part of the end polymerizable groups of the polymerizable liquid crystal compound of Chemical Formula 1 is addition-polymerized or cross-linked.

9. An optical element for liquid crystal display, including the optically anisotropic body according to claim 7.

* * * * *